(12) United States Patent
Peles et al.

(10) Patent No.: US 11,188,470 B2
(45) Date of Patent: Nov. 30, 2021

(54) DYNAMIC IDENTIFICATION OF STACK FRAMES

(71) Applicant: VDOO CONNECTED TRUST LTD., Tel-Aviv (IL)

(72) Inventors: Or Peles, Tel-Aviv (IL); Asaf Karas, Givataayim (IL); Ori Hollander, Bet Shemesh (IL); Shachar Menashe, Herzliya (IL)

(73) Assignee: VDOO CONNECTED TRUST LTD., Tel Aviv (IL)

(*) Notice: Subject to any disclaimer, the term of this patent is extended or adjusted under 35 U.S.C. 154(b) by 0 days.

(21) Appl. No.: 16/879,413

(22) Filed: May 20, 2020

(65) Prior Publication Data

US 2020/0371945 A1 Nov. 26, 2020

Related U.S. Application Data

(60) Provisional application No. 62/851,185, filed on May 22, 2019.

(51) Int. Cl.
*G06F 12/0875* (2016.01)
*G06F 21/62* (2013.01)

(52) U.S. Cl.
CPC ...... *G06F 12/0875* (2013.01); *G06F 21/6218* (2013.01); *G06F 2212/451* (2013.01)

(58) Field of Classification Search
CPC ............ G06F 12/0875; G06F 21/6218; G06F 2212/451
See application file for complete search history.

(56) References Cited

U.S. PATENT DOCUMENTS

| | | | | |
|---|---|---|---|---|
| 6,578,094 | B1* | 6/2003 | Moudgill | G06F 21/54 710/57 |
| 7,945,953 | B1* | 5/2011 | Salinas | G06F 21/52 726/22 |
| 2002/0072830 | A1* | 6/2002 | Hunt | G06F 9/5066 701/1 |
| 2004/0019744 | A1* | 1/2004 | Boucher | G06F 12/0223 711/132 |
| 2016/0196428 | A1* | 7/2016 | Momot | G06F 21/554 726/23 |
| 2018/0060568 | A1* | 3/2018 | Galenson | G06F 21/52 |
| 2018/0260564 | A1* | 9/2018 | Porteboeuf | G06F 11/28 |
| 2018/0373871 | A1* | 12/2018 | Lemay | G06F 21/566 |
| 2019/0227953 | A1* | 7/2019 | Trivedi | G06F 21/54 |
| 2020/0134172 | A1* | 4/2020 | Kim | G06F 8/65 |
| 2020/0371809 | A1* | 11/2020 | Niu | G06F 11/3664 |

* cited by examiner

*Primary Examiner* — Andrew J Cheong

(57) ABSTRACT

A method, system and product, configured to perform: during an execution of a program, obtaining boundaries of a stack frame of a function that is currently present in a stack, wherein said obtaining the boundaries comprises: obtaining a return address of the function in the stack; determining a length of the function using a mapping of return addresses of one or more functions in the program and corresponding lengths of the one or more functions; and determining the boundaries of the stack frame of the function based on a value of a stack pointer of the stack and based on the length of the function; based on the boundaries of the stack frame of the function, determining that the stack frame is overflown; and in response to said determining that the stack frame is overflown, performing a responsive action.

20 Claims, 9 Drawing Sheets

```
                    ; Attributes: bp-based frame
                    EXPORT func_a
                    func_a src= -0x10
                    dest= -0xC                    ← 410

00001720    000     STMFD   SP!, {R11,LR}      ; Store Block to Memory
00001724    008     ADD     R11, SP, #4        ; Rd = Op1 + Op2
00001728    008     SUB     SP, SP, #0x10      ; Rd = Op1 - Op2
0000172C    018     STR     R0, [R11, src]     ; Store to Memory
00001730    018     SUB     R3, R11, # - dest  ; Rd = Op1 - Op2
00001734    018     MOV     R2, #0             ; Rd = Op2       ← 420
00001738    018     STR     R2, [R3]           ; Store to Memory
0000173C    018     STRB    R2, [R3,#4]        ; Store to Memory
00001740    018     SUB     R3, R11, # - dest  ; Rd = Op1 - Op2
00001744    018     LDR     R1, [R11, #src]    ; src
00001748    018     MOV     R0, R3             ; dest
0000174C    018     BL      strcpy             ; Branch with Link
00001750    018     MOV     R3, #1             ; Rd = Op2
00001754    018     MOV     R0, R3             ; Rd = Op2
00001758    018     SUB     SP, R11, #4        ; Rd = Op1 - Op2
0000175C    008     LDMFD   SP!, {R11,PC}      ; Load Block from Memory
0000175C                                       ; End of function func_a
                                        430
```

FIG. 4

DYNAMIC IDENTIFICATION OF STACK FRAMES

CROSS-REFERENCE TO RELATED APPLICATION

This application claims the benefit of provisional patent application No. 62/851,185, entitled "Dynamic Identification Of Stack Frames" filed May 22, 2019, which is hereby incorporated by reference in its entirety without giving rise to disavowment.

TECHNICAL FIELD

The present disclosure relates to stack analysis in general, and to identification of stack frames during execution, in particular.

BACKGROUND

In information security and programming, a buffer overflow is an anomaly where a program, while writing data to a buffer, overruns the buffer's boundary and overwrites adjacent memory locations. One type of buffer overflow is stack buffer overflow. Stack buffer overflow occurs when a program writes to a memory address on the program's call stack outside of the intended data structure, which may be a fixed-length buffer. Stack buffer overflow bugs are caused when a program writes more data to a buffer located on the stack than what is actually allocated for that buffer. This may result in corruption of adjacent data on the stack, and in cases where the overflow was triggered by mistake, will often cause the program to crash or operate incorrectly.

Return-Oriented Programming (ROP) is a computer security exploit technique that allows an attacker to execute code in the presence of security defenses such as executable space protection and code signing. In ROP, an attacker gains control of the call stack to hijack program control flow and then executes carefully chosen machine instruction sequences that are already present in the machine's memory. Each instruction sequence typically ends in a return instruction and is located in a subroutine within the existing program and/or shared library code. Overflow vulnerabilities may use the ROP technique in order to execute code on the system.

BRIEF SUMMARY

One exemplary embodiment of the disclosed subject matter is a method comprising: during an execution of a program, obtaining boundaries of a stack frame of a function that is currently present in a stack, wherein said obtaining the boundaries comprises: obtaining a return address of the function in the stack; determining a length of the function using a mapping of return addresses of one or more functions in the program and corresponding lengths of the one or more functions; and determining the boundaries of the stack frame of the function based on a value of a stack pointer of the stack and based on the length of the function; based on the boundaries of the stack frame of the function, determining that the stack frame is overflown; and in response to said determining that the stack frame is overflown, performing a responsive action.

Optionally, the method comprises placing a canary value in a location in the stack that is adjacent to or on top of the return address of the function, wherein said determining that the stack frame is overflown comprises determining that a value at the location in the stack, after execution of the function up to the return address, is different than the canary value.

Optionally, determining that the stack frame is overflown is based on a predicted number of bytes to be utilized by the function and the boundaries of the stack frame.

Optionally, the method comprises verifying, prior to executing the function, that a memory address of the function is in the stack.

Optionally, the method comprises obtaining, during execution of the function, one or more memory addresses that are to be accessed by the function; and determining whether the one or more memory addresses are located in the stack, wherein, upon determining that the one or more memory addresses are not located in the stack, performing the responsive action.

Optionally, the method comprises determining that the stack frame is overflown based on a determination that the function has crossed the boundaries of the stack frame.

Optionally, the method comprises performing debugging of the program based on the mapping.

Optionally, a binary of the program comprises one or more hooks of the one or more functions, wherein said obtaining the boundaries utilizes at least one hook of the one or more hooks to obtain the return address of the function in the stack.

Optionally, the method comprises analyzing a binary of the program to identify functions that comprise memory access functionality, thereby identifying the one or more functions; and determining the mapping for the one or more functions.

Optionally, said obtaining the boundaries is performed iteratively by obtaining a length of a target function in the stack from the mapping, determining a base address of a stack frame of the target function based on a value of a stack pointer of the stack and based on the length of the target function, thereby obtaining boundaries of the stack frame of the target function, and identifying a next target function in the stack based on the boundaries of the stack frame of the target function.

Optionally, the responsive action comprises at least one of: terminating an execution of the program, raising an interrupt, limiting access to the function, and generating a report.

Optionally, the one or more functions are one or more vulnerable functions identified in the program.

Another exemplary embodiment of the disclosed subject matter is computer program product comprising a non-transitory computer readable storage medium retaining program instructions, which program instructions when read by a processor, cause the processor to perform: during an execution of a program, obtaining boundaries of a stack frame of a function that is currently present in a stack, wherein said obtaining the boundaries comprises: obtaining a return address of the function in the stack; determining a length of the function using a mapping of return addresses of one or more functions in the program and corresponding lengths of the one or more functions; and determining the boundaries of the stack frame of the function based on a value of a stack pointer of the stack and based on the length of the function; based on the boundaries of the stack frame of the function, determining that the stack frame is overflown; and in response to said determining that the stack frame is overflown, performing a responsive action.

Yet another exemplary embodiment of the disclosed subject matter is a system, the system comprising a processor and coupled memory, the processor being adapted to perform: during an execution of a program, obtaining boundaries of a stack frame of a function that is currently present in a stack, wherein said obtaining the boundaries comprises: obtaining a return address of the function in the stack; determining a length of the function using a mapping of return addresses of one or more functions in the program and corresponding lengths of the one or more functions; and determining the boundaries of the stack frame of the function based on a value of a stack pointer of the stack and based on the length of the function; based on the boundaries of the stack frame of the function, determining that the stack frame is overflown; and in response to said determining that the stack frame is overflown, performing a responsive action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 illustrates a schematic illustration of a screen capture, in accordance with some exemplary embodiments of the disclosed subject matter;

DETAILED DESCRIPTION

One technical problem dealt with by the disclosed subject matter is to identify stack frames within a stack of an executed program during runtime. In some exemplary embodiments, a stack frame may comprise a collection of data on the stack of the executed program that is associated with one subprogram call. Typically, stack frames include a return address of the subprogram, argument variables passed on the stack, local variables of the subprogram, and saved copies of any registers modified by the subprogram that need to be restored. In some cases, it may be desired to identify the stack frames for different purposes, such as for preventing Return-Oriented Programming (ROP) attacks, for preventing exploitation of overflow vulnerabilities, for preventing memory leaks, for providing debug information, or the like.

Figure 1:
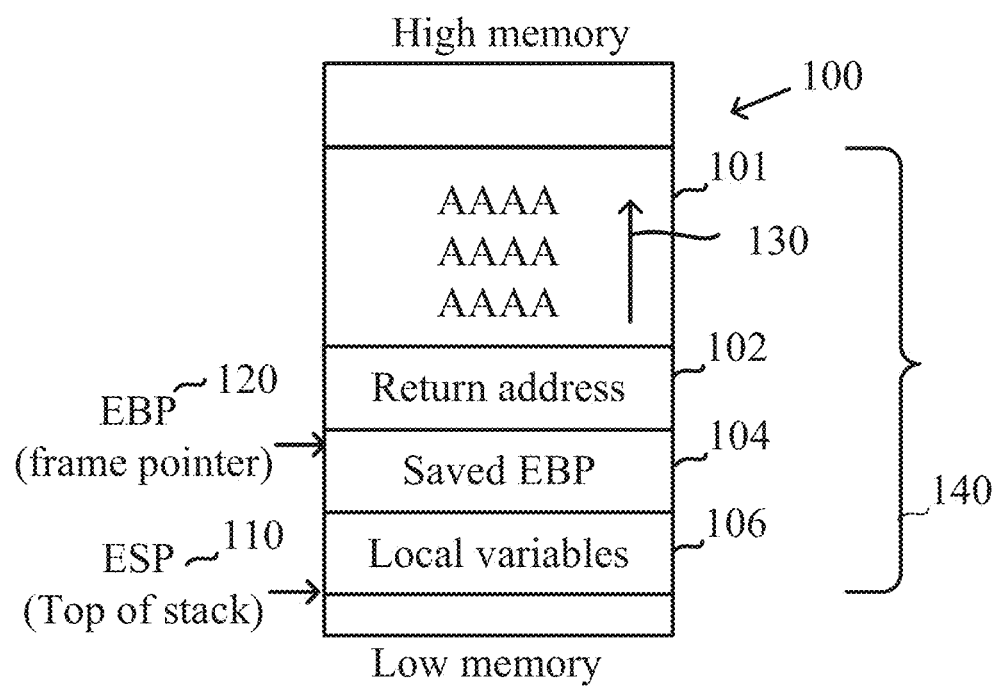
FIG. 1 illustrates a schematic illustration of a layout of a stack, in accordance with some exemplary embodiments of the disclosed subject matter.

Referring now to FIG. 1 showing an illustration of a stack, in accordance with some exemplary embodiments of the disclosed subject matter.

In some exemplary embodiments, Stack 100 may be a call stack, execution stack, program stack, control stack, runtime stack, machine stack, or the like. In some exemplary embodiments, Stack 100 may be a program's stack memory layout, e.g., in an assembly language such as x86 assembly. In some exemplary embodiments, a frame pointer such as Extended Base Pointer (EBP) 120 may be the base pointer register for a Stack Frame 140 in Stack 100. In some exemplary embodiments, a stack pointer of Stack 100 such as Extended Stack Pointer (ESP) 110 may be configured to point to a top of Stack 100.

In some exemplary embodiments, Stack 100 may comprise one or more stack frames including Stack Frame 140, that are each associated with a respective active subprogram call (also referred to as a subroutine or function). For example, Stack Frame 140 may be associated with the strcpy( ) standard library function, or with any other subroutine. In some cases, denoted Arrow 130 may indicate a stack growth direction of Stack 100. In some exemplary embodiments, the stack growth direction may be from low memory to high memory. Additionally or alternatively, the stack growth direction may be from high memory to low memory.

In some exemplary embodiments, Stack Frame 140 may include Arguments 101 passed to the subroutine (if any), a Return Address 102 such as a saved Extended Instruction pointer (EIP) that can be utilized to return back to the subroutine's caller, saved register values such as a Saved EBP 104, space for Local Variables 106 of the subroutine (if any), or the like. In some exemplary embodiments, EBP 120 may contain the base address of Stack Frame 140, e.g., to determine relative locations of variables or arguments of Stack Frame 140 in relation to EBP 120 so as not to be dependent on Stack Pointer 110. In some exemplary embodiments, local variables within a stack frame such as Local Variables 106 may be accessed in terms of their offsets from the frame pointer, e.g., EBP 120. The saved register values may be used to define Return Address 102 upon concluding execution of the subroutine. Additionally or alternatively, the saved register values may be used to define an address for the stack pointer ESP 110 upon concluding execution of the caller function.

In some exemplary embodiments, the subroutine of Stack Frame 140, e.g., the strcpy( ) function, may be called with a destination buffer that may be a local variable of the subroutine's stack frame in Stack 100. The destination buffer may reside on the caller function's Stack Frame 140, e.g., within Local Variables 106. In some exemplary embodiments, in order for the destination buffer to function properly, as intended, memory used by the destination buffer may not overflow out of a space allocated to Local Variables 106, e.g., by using more memory than the memory allocated to Local Variables 106.

In some exemplary embodiments, ROP or other stack smashing attacks may arise when an adversary manipulates the call stack, e.g., Stack 100, by taking advantage of a bug in the program, such as buffer overflow vulnerabilities. Buffer overflow vulnerabilities may be a common problem among executable programs written in different programming languages, such as C and C++. Such vulnerabilities commonly involve stack-buffers. Multiple buffer overflow vulnerabilities have been identified in LINUX™-based devices, bare-metal devices, including devices manufactured by FOSCAM™, HIKVISION™, QNAP™ and BOSCH™, or the like. Different examples are listed in OWASP (www.owasp.org/index.php/Buffer_Overflows).

In a buffer overflow attack, the attacker may write attack code (a "payload") onto Stack 100 that may overrun the borders of Local Variables 106 space and overwrite Saved EBP 104 and Return Address 102 with the location of the instructions. In such vulnerabilities, when writing to a buffer, more bytes may be written to a buffer within Local Variables 106 area than the size of buffer, causing the bytes to overwrite the data past the end of the buffer and into the next sections of Stack 100. An outcome of a stack overflow may be that a saved return-address pointer is overwritten, allowing an attacker to control the program's flow of execution.

Additionally or alternatively, buffer overflows may be carried out using standard library utility functions that handle memory access functionalities such as strings copying or manipulation, data copying, or the like. For example, the C standard library (also referred to as libc) may include standard library functions such as strcpy, strcat, printf, gets, memcpy, or the like. Such functions may not perform proper bounds checking before storing user-provided data into memory and may accept more input data than it can store properly. Furthermore, even when using safe functions such as strncpy that limits the copy length according to a user-supplied length parameter, the user may mistakenly indicate a size that is bigger than the actual buffer. If the data is being written onto Stack 100, the excess data may overflow the space allocated to the function's variables, e.g., Local Variables 106, and overwrite Saved EBP 104 and Return Address 102. Saved EBP 104 and Return Address 102 may be necessary for redirecting control flow back to the caller that invoked the subroutine of Stack Frame 140. In case Return Address 102 was overwritten, control flow may be diverted to the location specified by the new return address.

Figure 2:
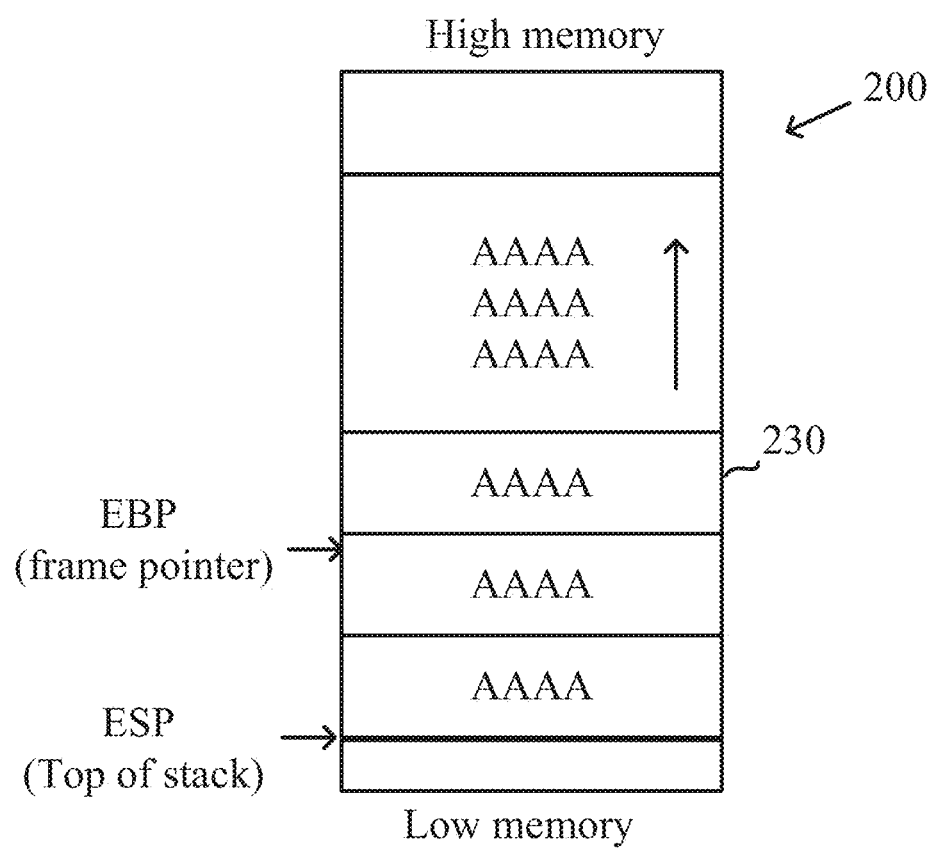
FIG. 2 illustrates a schematic illustration of a stack buffer overflow.

Referring now to FIG. 2 showing an illustration of a stack-based buffer overflow.

In some exemplary embodiments, Stack 200 may correspond to Stack 100 (FIG. 1). In some exemplary embodiments, Stack 200 may comprise a stack frame of a memory access function, e.g., a strcpy( ) function.

In some exemplary embodiments, the strcpy( ) function may not perform any bounds checking before executing its functionality, e.g., the copy operation. By copying more bytes than the destination buffer capacity, an attacker may manipulate the content of the adjacent stack memory on Stack 200, e.g., memory that previously had a return address such as Return Address 102 (FIG. 1), Saved EBP 104 (FIG. 1), or the like. In some exemplary embodiments, the attacker may write Alternative Return Address 230 onto Stack 200. By overflowing from the stack frame bounds, the saved return-address pointer may be overwritten, allowing an attacker to control the program's flow of execution. In some exemplary embodiments, it may be desired to identify the stack frames bounds for identifying attacks on the control flow.

Another technical problem dealt with by the disclosed subject matter is to identify stack frames during runtime in absence of compiler indications. In some cases, a compiled executable may comprise information hinting or directly indicating the stack frames within the stack, e.g., frame pointers such as EBP 120 (FIG. 1). However, some compilers may not provide such information. Additionally or alternatively, optimization flags may be used to reduce information and cause the compiler to avoid adding such information. Even in the absence of such information, it may nevertheless be desired to identify the stack frames during runtime.

Yet another technical problem dealt with by the disclosed subject matter is to identify stack frames in the absence of frame pointers, e.g., which may indicate stack frame information. In some cases, it may be desired to identify the stack frames for different purposes, such as for preventing ROP attacks, for preventing exploitation of overflow vulnerabilities, for preventing memory leaks, for providing debug information, or the like. In some exemplary embodiments, binaries that are compiled without frame-pointers may be encountered. Due to the lack of frame-pointers, debuggers will not be able to produce a stack-trace. A stack-trace may be an important tool as part of the debugging process, that comprises information of the currently active frames on the stack and their associated return-addresses and help the debugger (human or tool) understand the program's logic.

Yet another technical problem dealt with by the disclosed subject matter is to identify ROP attacks and lesser memory attacks, which may utilize overflow vulnerabilities, e.g., such as the buffer overflow attack exemplified in FIG. 2, and protect computers therefrom. In some exemplary embodiments, it may be desired to identify ROP attacks and lesser memory attacks so that countermeasures may be taken. In some exemplary embodiments, in case boundaries of stack frames are not available, it may be difficult to identify exploitations of overflow vulnerabilities.

In some exemplary embodiments, buffer overflow protection may be provided by operating systems in order to defend from buffer overflow attacks. Buffer overflow protection may comprise various techniques used during software development to enhance the security of executable programs by detecting buffer overflows on stack-allocated variables and preventing them from causing program misbehavior or from becoming serious security vulnerabilities. In some exemplary embodiments, operating systems may combat the exploitation of buffer overflow bugs by marking the memory where data is written, read, manipulated, or the like, as non-executable. Using such marking, the machine may refuse to execute code located in user-writable areas of memory, preventing the attacker from placing payload on the stack and jumping to it via a return address overwrite. With data execution prevention, an adversary cannot execute maliciously injected instructions because a typical buffer overflow overwrites contents in the data section of memory, which is marked as non-executable. However, ROP can defeat security mechanism such as data execution prevention by directing the return address to instructions that are already present in the program code. A typical data execution prevention may not defend against ROP attacks since the adversary may not use malicious code but rather may combine "good" instructions by changing return addresses; therefore, the code used would not be marked as non-executable.

Additionally or alternatively, compilers may provide stack canaries in order to identify, in runtime, that a buffer overflow has occurred. Buffer overflow protection may modify the organization of stack-allocated data, so it includes a canary value that, when destroyed by a stack buffer overflow, shows that a buffer preceding it in memory has been overflown. Referring back to FIG. 1, the canary value may be inserted after Local Variables 106, e.g. before Return Address 102, instead of Return Address 102, or the like. Stack canaries may cause the compiler to emit code that stores a few random bytes, or any other known value, e.g., the stack-canary, in the stack memory upon function entrance (in the function's prologue). For example, when executing Stack Frame 140, before proceeding to the function's tasks, e.g., such as allocating buffers on Stack 100, the compiler may store a stack canary. The stack-canary may be replaced with the function's Return Address 102 on the stack or placed in a nearby or adjacent location. As a result, any sequential buffer overwrite cannot overwrite Return Address 102 without overwriting the stack-canary. Just before the function returns (in the function's epilogue), the code loads the stack-canary bytes from the same stack location, e.g., where they were stored, and compares them with their expected (original) value. A change in the value may indicate that a buffer overflow has occurred and has overwritten the stack-canary value, and possibly continued overwriting stack memory. In such case, a responsive action may be performed, e.g., the program may be immediately terminated in order to avoid unstable program state, code execution by an attacker, or the like. By verifying the canary value, execution of the affected program can be terminated, preventing it from misbehaving or from allowing an attacker to take control over it.

However, the canary technique may be overcome by an attacker, if the canary value remains unchanged. In case the attacker knows about the stack-canary, and can determine the value of the canary, the attacker may insert the same value of the canary at the location of the stack-canary, when overwriting a buffer. Additionally or alternatively, in order to utilize the canary technique, it may be required to know the canary value, the size of the stack, the function's return address, the stack frames, or the like. However, such information may not always be readily available during execution, e.g., in cases that the compiler does not provide such information.

Instead of or in addition to utilizing compiler-based stack canaries, runtime canaries may be utilized. Runtime canaries may be an implementation of a similar mechanism to the compiler-based stack canaries. In some exemplary embodiments, runtime canaries may be used to protect code that was not compiled with the stack-canaries protection feature. This mechanism may be based on hooking code of potentially vulnerable functions which may provide memory access functionality, such as the strcpy function, and storing stack-canary values on top of the return-address at risk. Then, allowing the hooked function (e.g., strcpy) to run, and afterwards, similarly to the compiler-based solution, observing the canary value on the stack memory.

In some exemplary embodiments, vulnerable functions in libc, such as strcpy( ), may be re-implemented not to write a stack variable beyond the stack frame's limit. The limit may be determined based on the notion that the buffer cannot extend beyond its stack frame. Thus the maximum size of a buffer may be the distance between the address of the buffer and the corresponding frame pointer. However, this technique requires the identification of the stack-frames.

Figure 3:
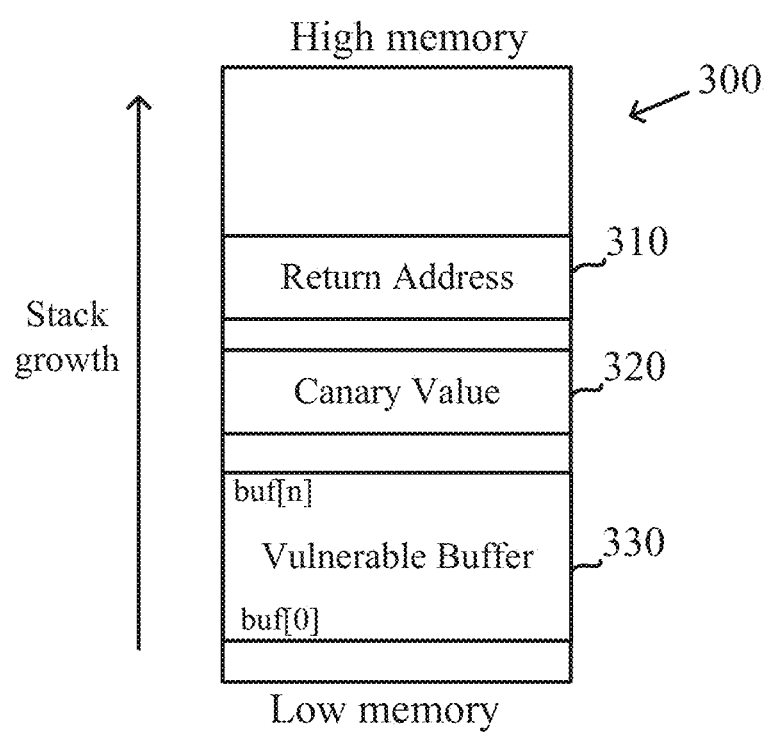
FIG. 3 illustrates a schematic illustration of a layout of a stack frame which may be utilized by the disclosed subject matter, in accordance with some exemplary embodiments of the disclosed subject matter.

Referring now to FIG. 3 showing an illustration of a layout of a stack frame with a stack canary value, in accordance with some exemplary embodiments of the disclosed subject matter.

In some exemplary embodiments, a Canary Value 320 may be included in Stack 300, in order to identify, in runtime, that a buffer overflow of Buffer 330 has occurred. In some exemplary embodiments, Canary Value 320 may be placed on Stack 300 to provide an indication that content was written outside of the stack's frame boundaries in case such a scenario occurs. In some exemplary embodiments, as illustrated in FIG. 3, a canary value such as Canary Value 320 may be placed by the compiler before Return Address 310 of the subroutine. In some exemplary embodiments, Canary Value 320 may separate the function's local variables, e.g., which includes Buffer 330, from the stored Return Address 310. Additionally or alternatively, a dynamic Canary Value 320 may be placed on the fly, during execution, or the like, on top of Return Address 310, on top of a portion thereof, or the like (not illustrated). In case a buffer overflow of Buffer 330 occurs, e.g., by an adversary, Canary Value 320 may be overwritten. After executing the function, e.g., before it returns, the code may load the stack-canary bytes and may compare them to the original value of Canary Value 320. In case they have changed, it may indicate that a buffer overflow of Buffer 330 has occurred, overwritten Canary Value 320, and possibly continued overwriting stack memory. In some exemplary embodiments, in case Canary Value 320 replaced Return Address 310, Return Address 310 may be fetched and may be inserted above Canary Value 320, e.g., at the location of the original Return Address 310, so as to allow returning to the correct return address.

Yet another technical problem dealt with by the disclosed subject matter is to implement runtime canaries to protect against buffer overflow attacks, e.g., in the absence of frame pointers. In some exemplary embodiments, implementing runtime canaries may require identifying the stack frames in the stack. In some exemplary embodiments, code that was not compiled, or that was not compiled with frame pointers, may not enable identifying the stack frames in the stack. For example, in case a code is compiled with a -fomit-frame-pointer flag, which omits the storing of stack frame pointers during function calls, the compiled binary may not provide explicit information regarding the boundaries of each stack frame. In some exemplary embodiments, the -fomit-frame-pointer option may instruct the compiler not to store stack frame pointers if the function does not need it. In some exemplary embodiments, in such cases, the compiled binary may not provide explicit information regarding the boundaries of each stack frame. As example, Advanced RISC Machine (ARM™) code compiled with a recent version of GNU Compiler Collection (GCC™) compiler may have the -fomit-frame-pointer by default, thus preventing implementation of the runtime canaries. In some cases, it may be desired to implement runtime canaries on executables that are compiled to exclude use of frame pointers, on executables having a shared object (DLL) that was compiled to exclude use of frame pointers, or the like.

One technical solution is to identify stack frames during execution, e.g., without relying on frame pointers, on compiler indications, or the like. In some exempla embodiments, the stack frames boundaries and layouts may be determined by employing binary analysis techniques on the target binaries planned to be protected, either in advance or during runtime. The binary analysis techniques may include extracting stack-offset information of function-call locations and using this information at a runtime agent to identify the stack frames and understand layout thereof, e.g., without relying on frame-pointers.

In some exemplary embodiments, binary analysis techniques may be implemented to identify functions that provide access to memory actions. In some exemplary embodiments, a binary of a program may be analyzed to identify functions in the program that comprise memory access functionality, or any other functionality that may indicate that the functions are potentially a target to memory corruption attacks. In some exemplary embodiments, based on analyzing the binary, one or more functions that are potentially vulnerable, are a potential target, or the like, may be identified. In some exemplary embodiments, the one or more functions may be determined based on analyzing the binary, or may be obtained from a server, from an apparatus, from a user, or the like, e.g., via indications.

In some exemplary embodiments, mappings (also referred to as "ret_spd_table") between return addresses of the one or more functions that are potentially vulnerable and corresponding lengths of the one or more functions may be determined, obtained, or the like. In some exemplary embodiments, the length of a function, e.g., measured with respect to assembly lines, machine code lines, or the like, may be determined based on its return address and on the stack offset delta or difference, relatively to the function's beginning. In some exemplary embodiments, the mappings of the one or more functions may be determined based on analyzing the binary or may be obtained from a server, from an apparatus, from a user, or the like.

In some exemplary embodiments, an executable file of the program may comprise one or more code hooks, code patches, or the like, which may be located in the one or more functions that are potentially vulnerable, adjacent thereto, e.g., in one or more adjacent memory addresses, or within a predetermined address range therefrom. In some exemplary embodiments, hooks may be inserted to the one or more functions that are potentially vulnerable. In some exemplary embodiments, the boundaries may be obtained by utilizing at least one hook of the one or more hooks. In some exemplary embodiments, the hooks may be used by a runtime protection agent, or by any other software agent, to identify a write operation that has the potential to cause buffer overflows, a read operation that has the potential to cause memory leaks, or the like. In some exemplary embodiments, during execution of the program, the call stack may include one or more active functions, subroutines, or the like. In some exemplary embodiments, boundaries of a stack frame of a function in the stack that is potentially vulnerable may be obtained, e.g., by a runtime agent, as described below.

In some exemplary embodiments, in order to obtain the boundaries of the stack frame, a return address of the function that is located in the stack may be obtained, e.g., using a hook of the function. In some exemplary embodiments, a length of the function may be retrieved from the mappings of the return addresses of one or more functions in the program and the corresponding lengths of the one or more functions. In some exemplary embodiments, the length of the function may be retrieved from the mappings by locating the return address of the function in the mappings and retrieving the associated function length. In some exemplary embodiments, a base address of the stack frame of the function may be determined based on a value of a stack pointer, e.g., which may be configured to point to a top of the call stack, to which the extracted length of the function may be added. In some exemplary embodiments, the base address of the stack frame may be determined to be at a location that is a sum of the extracted length and the location indicated by the stack pointer, e.g., in the direction of the stack growth. In some exemplary embodiments, boundaries of the stack frame may be determined based on the base address of the stack frame.

In some exemplary embodiments, next stack frames may be determined iteratively, e.g., by entering a next hook of a next function, obtaining a return address of the next function, retrieving the associated function length from the mappings to determine the boundaries of the stack frame, and finding the next stack frame after the boundaries. In some exemplary embodiments, boundaries of a stack frame of a target function may be determined based on a value of a stack pointer of the stack as a base address and based on the length of the target function as an offset from the base address.

In some exemplary embodiments, the stack frame may be determined to be overflown or not overflown based on the determined boundaries of the stack frame of the function. In some exemplary embodiments, a stack layout may be inferred in the absence of frame-pointers such as EBP 120 (FIG. 1), e.g., based on the determined boundaries.

In some exemplary embodiments, the stack frame may be determined to be overflown based on a predicted number of bytes to be utilized by the function and the boundaries of the stack frame. In some exemplary embodiments, a maximal size of memory or memory capacity that can be placed within the boundaries of the stack frame without overflowing the stack frame may be determined, e.g., based on a determined layout of the stack frame. In some exemplary embodiments, the maximal size of memory may be compared to the size of the intended memory access operation, e.g., in bytes, which may be determined or predicted prior to executing the memory access operation. In some exemplary embodiments, an overflow may be concluded based on determining that the size of the intended operation exceeds the maximal size of memory of the stack frame.

In some exemplary embodiments, the determined boundaries may be used in runtime to insert a canary value to the stack, e.g., enabling to determine real time stack frame overflows. In some exemplary embodiments, identifying layouts of the stack frames may enable to replace canaries with chosen stack memory addresses such as return addresses in real time, to identify any crossing of the boundaries, or the like. In some exemplary embodiments, a canary value may be placed in a location of the return address of the function in the stack, a portion thereof, in an adjacent location, or the like. In some exemplary embodiments, the stack frame may be determined to be overflown in case that, right before completing an execution of the function, a value at the location of the canary value in the stack is determined to be different than the original canary value. In some exemplary embodiments, in case the canary value is maintained, the return address may be switched back and replace the canary value. These techniques may be used to compensate for missing frame pointer data.

In some exemplary embodiments, in response to determining that the stack frame is overflown, a responsive action may be performed. In some exemplary embodiments, the responsive action may comprise terminating an execution of the program, raising an interrupt, limiting access to the function, generating a report, inserting the original return address to the stack, or the like.

In some exemplary embodiments, prior to executing the function, or during the execution, an address of the function may be verified to be in the stack. In some exemplary embodiments, in case the address of the function is not in the stack, the stack may be determined to be overflown, an interrupt may be raised, or the like.

In some exemplary embodiments, during execution of the function, one or more memory addresses that are supposed to be accessed by the function may be obtained. In some exemplary embodiments, whether the one or more memory addresses are located in the stack may be determined. In some exemplary embodiments, upon determining that the one or more memory addresses are not located in the stack, the responsive action may be performed.

Referring now to FIG. 4 showing a screen-capture from a disassembler software, in accordance with some exemplary embodiments of the disclosed subject matter.

In some exemplary embodiments, an exemplary mapping of a return address of a function with the corresponding length of the function may be described with respect to Interactive Disassembler (IDA) Screen 400. In some exemplary embodiments, IDA may be an exemplary disassembler for computer software that generates assembly language source code from machine-executable code. IDA Screen 400 may show assembler instructions of a function, such as in ARM 32 bit architecture. For each assembler instruction (such as 410-430), the second column in the figure (450) may list the Stack Pointer Delta (SPD), which may indicate a delta (e.g., the difference) between the current stack-pointer location, e.g., which is configured to point to the top of the stack, and the location it pointed to upon entering the function presented in IDA Screen 400. As an example, the delta for Instruction 420 (STRB instruction) between the current stack-pointer location and the location it pointed upon the function's entrance is 18 in hexa-decimal representation, as can be seen in the corresponding Column 450.

In some cases, the mapping between return addresses of the one or more functions and corresponding lengths of the one or more functions (also referred to as ret_spd_table) may be prepared based on IDA Screen 400. As an example, for the function call in line 0000174c, which relates to the strcpy function which may be a potentially vulnerable function that can cause a buffer overflow, the following pair may be added to the ret_spd_table: the return address to which the strcpy function is expected to return, i.e., the address adjacent to 0000174c and in this example address 00001750, and the SPD listed at the line of the function, e.g., the SPD value at line 0000174c (whose value is 18 in hexa-decimal representation). In some exemplary embodiments, the return address 00001750 and the SPD value of 18 in hexa-decimal representation may comprise a mapping between the return address of the strcpy function and the corresponding length of the strcpy function. In some exemplary embodiments, since an SPD value of a function indicates the difference between the current stack-pointer location and the location it pointed to upon entering the function, and the return address of the function is the adjacent address, this pair may correspond to the mapping between the return address of the function and the corresponding length of the function.

Another technical solution is to utilize the disclosed subject matter to determine stack frames boundaries during a debugging process. In some exemplary embodiments, debugging of the program may be performed based on the mapping between return addresses of the one or more functions and corresponding lengths of the one or more functions, which may be utilized to identify the stack frames. In some exemplary embodiments, at any stage of the debugging process, e.g., at a crash, breakpoint, or the like, a stack layout including a division of the stack into stack frames, may be inferred based on the determined stack frames.

One technical effect of utilizing the disclosed subject matter is dynamically identifying stack frames without relying on stack frame pointers or flags, e.g., while only relying on the stack pointer. For example, with reference to FIG. 1, the frame pointer EBP 120 is not relied upon, while the stack pointer ESP 110 is relied upon by the disclosed subject matter. By identifying the stack frames dynamically during the runtime, the location of the dynamic canary values may be efficiently determined and placed, and buffer overflows may be efficiently identified and prevented.

Another technical effect of utilizing the disclosed subject matter is to determine stack frame boundaries during debugging. In some exemplary embodiments, the disclosed method may be utilized during a debugging of the binary of a program. As opposed to forking the program and resuming execution in the forked instances, while following the stack pointer and return opcodes to infer, in retrospect, the stack frames, the disclosed subject matter provides a swift result that does not depend on the execution speed or require the program to successfully continue execution.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 5:
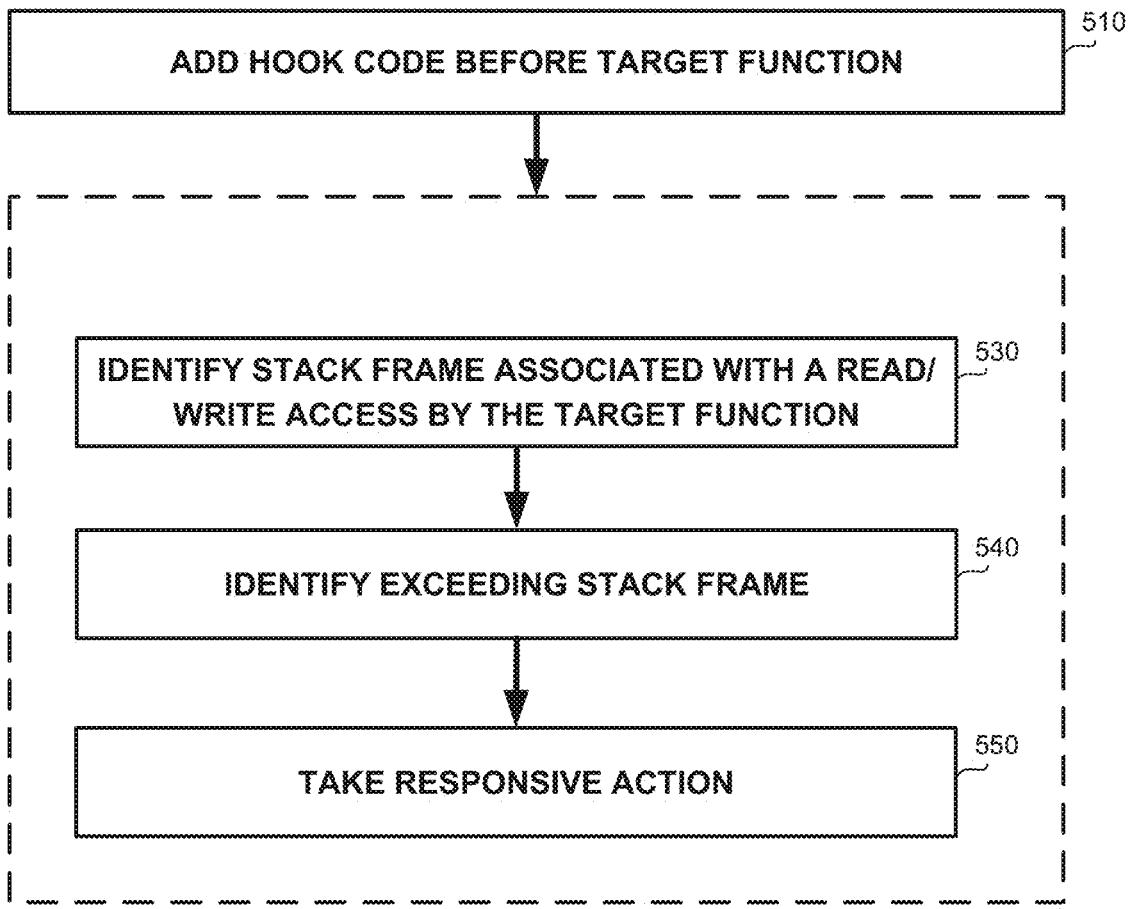
FIG. 5 illustrates a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On Step 510, hook code, code patches, or the like, may be added before target functions. In some exemplary embodiments, target functions may be functions that are susceptible to buffer overflow vulnerabilities, functions that buffer overflows may be carried out thereby, or the like. As an example, target functions may be functions that handle strings copying or manipulation, data copying, or the like, such as: strcpy, strcat, sprintf, memcpy, strncpy, strncat, snprintf, or the like. Additionally or alternatively, target functions may be functions that may be associated with potential memory leakage, such as reading memory addresses.

In some cases, Step 510 may be performed in advance, may be performed during compilation of the code, may be performed before or during execution, such as using instrumentation, or the like. In some exemplary embodiments, the hooked functions may be provided in a dynamically linked library (DLL) or similar mechanism enabling compiled code to invoke the hooked functions.

On Step 530, during execution of the hook code, a stack frame associated with a read/write operation by the target function may be identified. The identification may be performed as is disclosed, for example, in FIG. 6.

On Step 540, exceeding stack frame may be identified. In some exemplary embodiments, identifying exceeding stack frame with respect to a read operation by the target function may be indicative of a memory leak. Additionally or alternatively, identifying exceeding stack frame with respect to a write operation by the target function may be indicative of a buffer overflow, a ROP attack, or the like.

In some exemplary embodiments, based on the identified stack frame of the target function, a canary technique may be used. The stack frame's saved return address location may be backed up. A canary value may be placed over the return address in the stack. After invocation of the target function, performing its intended functionality, the canary value may be checked to determine whether it is changed. A change of the canary value may be indicative of cases in which a buffer overflow overwritten the saved return-address on the stack. In a case the canary value has not changed, the backed-up return address may be restored to the saved return address location, and execution may continue. If the canary value has changed, buffer overflow may be reported, and a proper responsive action may be performed.

Additionally or alternatively, the number of bytes that the hooked function will write to the destination buffer may be calculated based on the identified stack frame. A determination whether the write operation would cross the stack frame boundaries may be performed in advance and prior to the execution of the functionality of the target function. Similarly, read operation may be analyzed to determine whether the memory that would be read, would include also memory from two different stack frames, e.g., cross its stack frame boundaries.

In some exemplary embodiments, Steps 530-540 may be performed with respect to memory access (e.g., read operation or write operation) that is associated with access to stack memory, e.g., only. In some cases, it may be possible to identify that the memory access is performed with respect to heap memory, and thus the stack frames may not be identified as the hooked function may not be accessing stack memory.

On Step 550, a responsive action may be taken. In some exemplary embodiments, the execution may be terminated. In some cases, a relevant interrupt may be raised. Additionally or alternatively, countermeasures may be utilized, such as limiting the access to avoid crossing stack frame boundaries. Additionally or alternatively, a report may be provided to an administrator, or the like.

Figure 6:
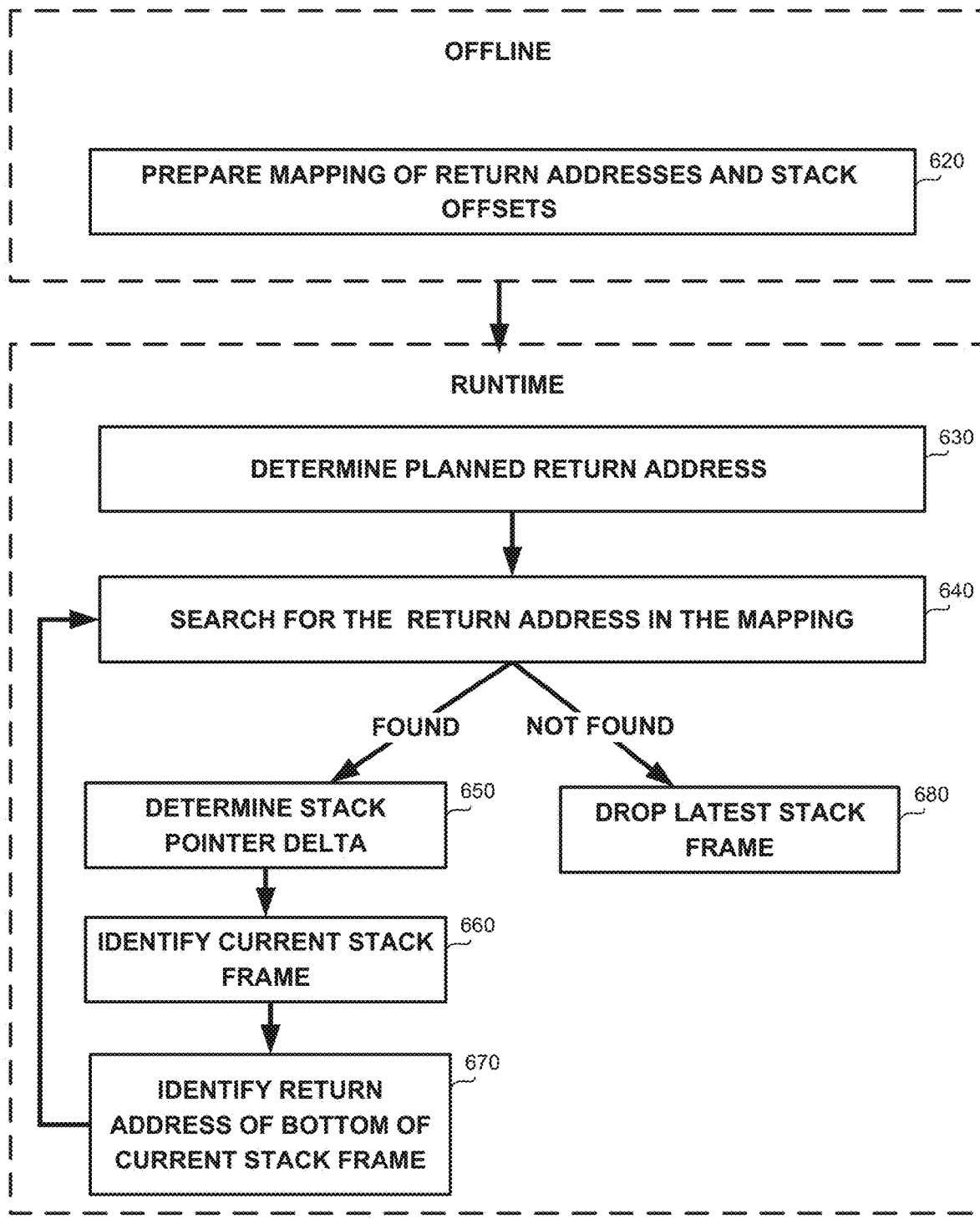
FIG. 6 illustrates a flowchart diagram of a method, in accordance with some exemplary embodiments of the disclosed subject matter.

Referring now to FIG. 6 showing a flowchart diagram of a method for inferring the stack frames boundaries, in accordance with some exemplary embodiments of the disclosed subject matter.

On Step 620, a mapping between return-addresses of functions and the functions' lengths, e.g., their stack offsets deltas relatively to the functions' beginning, may be prepared. In some exemplary embodiments, the Stack Pointer Deltas relatively to function beginning may be referred to as SPD or a function length, and the mapping may be stored in a list referred to as link register to SPD (ret_spd_table). In some exemplary embodiments, the executable may be analyzed prior to execution. Additionally or alternatively, the executable may be analyzed during execution, such as in the beginning of the execution.

Additionally or alternatively, in order to prepare the mapping, branch instructions to target functions (in the caller function) may be found, identified, or the like. For each branch instruction, the function length of the target function may be calculated by going over assembly instructions from the beginning of the target function until the end of the target function. In some exemplary embodiments, the amount in which the stack pointer progressed, backward, forward, or the like, over the assembly instructions, may be accumulated to determine the SPD. The return address from the target function, e.g., the address of the following instruction, may be mapped to the SPD, thereby mapping a length of each target function to the next memory address.

In some exemplary embodiments, the ret_spd_table may map each potential return address within the caller function, that is reached after returning from a target function invoked within the caller function, to the SPD at the time the called function was invoked. Referring back to FIG. 4, the return address from strcpy (invoked in address 0000174C) would be 00001750, and would be mapped with SPD 0×018, which is the SPD at the time strcpy is invoked (e.g., in address 0000174C). In some exemplary embodiments, each caller function in the main program binary, or each caller function in each shared object (DLL) it depends on, may be analyzed to determine the ret_spd_table of the program.

It may be appreciated that Step 620 may be performed offline, e.g., before executing a caller function. The next steps may be performed during the runtime of the caller function.

On Step 630, during execution, when it is desired to determine stack frames, the planned return address of the current executed function may be determined. In some exemplary embodiments, the planned returned address may be saved in the bottom of the frame, or in proximity thereof, at a predetermined offset therefrom, such as in a Link Register (LR) in ARM architecture, on the stack in the function's prologue, or the like. In some exemplary embodiments, the planned return address of the current function may be determined as the current function may be a hooked function that was just called, and the stack was not yet manipulated. Additionally or alternatively, the current function may be a function useful for analyzing the stack frames. For example, the current function may be stack-frame-analysis( ), which may be invoked during a debugging session performed by the user.

On Step 640, the return address may be searched for in the mapping between return-addresses and their stack offsets deltas relatively to function beginning (e.g., the ret_spd_table).

On Step 680, in case the return address is not found in the mapping between return-addresses and their stack offsets deltas relatively to function beginning (e.g., the ret_spd_table), the stack frame may not be identified. In some exemplary embodiments, being unable to identify the current stack frame may be indicative of a malicious intervention and a responsive action may be performed. Additionally or alternatively, other mechanism for identifying the current stack frame may be employed, such as mechanisms which may be less efficient, require execution of a forked instance, or the like.

On Step 650, in case the return address is found in the ret_spd_table, the length of the current executed function may be retrieved from the ret_spd_table. The length may include the stack-pointer-delta from the current stack pointer to the base of the current frame.

On Step 660, the base of the current stack frame of the current executed function may be identified. In some exemplary embodiments, the current stack frame may be determined based on the offset, SPD, length, or the like, and the current stack pointer. For example, the SPD may indicate that the offset is of 018 units from the beginning of the stack frame. Hence, using the current stack pointer and the SPD, the base of the current stack frame may be computed.

On Step 670, the return address at the bottom of the current stack frame (or in proximity thereof) may be identified. The returned address may be then searched for according to Step 640, e.g., in the ret_spd_table, to identify the bottom of the next stack frame.

It may be appreciated that Steps 640-670 may be iteratively performed. In some exemplary embodiments, the iterative execution may be performed, for example, until reaching a desired stack frame.

Figure 7:
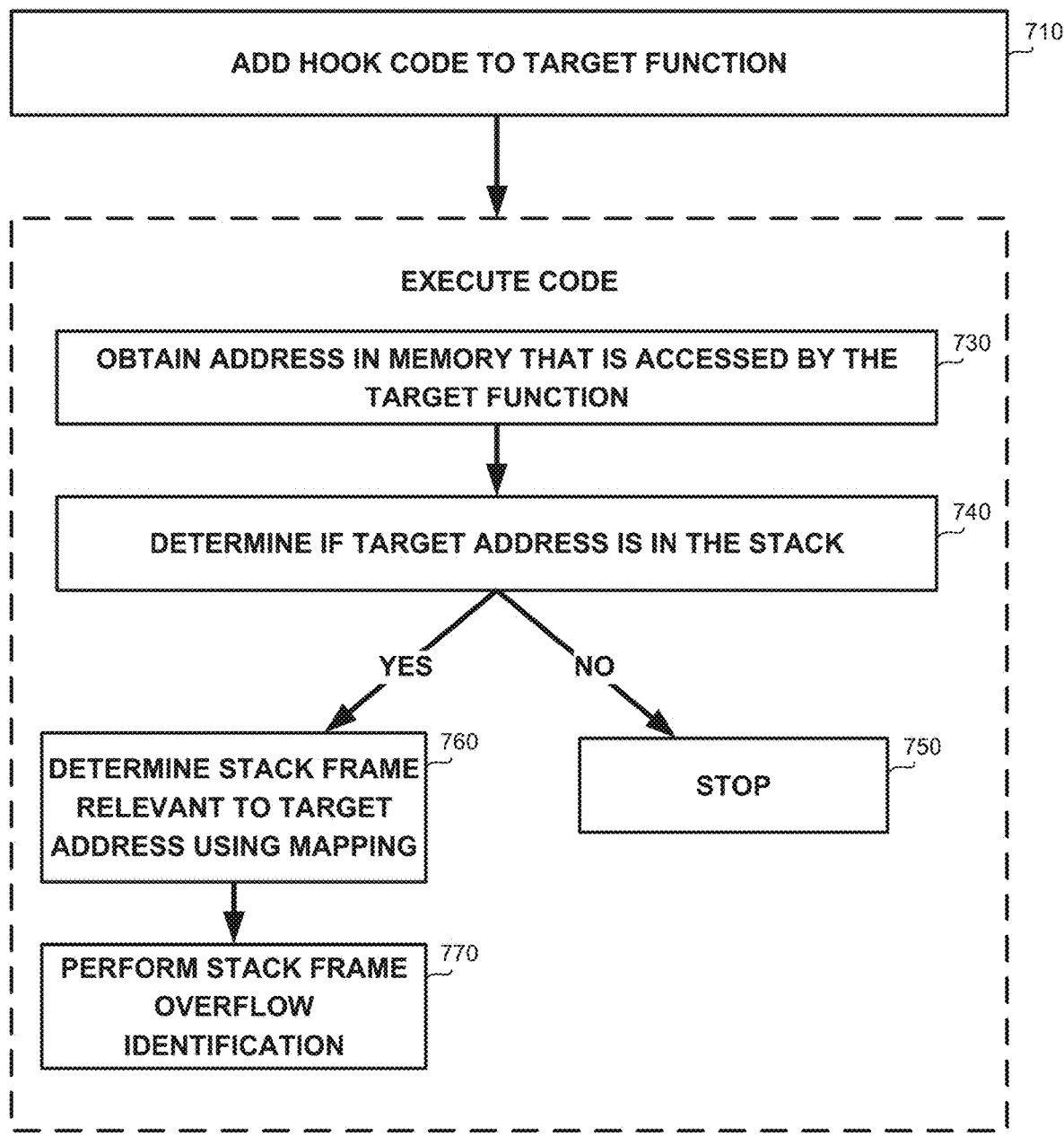
FIG. 7 illustrates a flowchart diagram of a method, in accordance with some exemplary embodiments of the disclosed subject matter.

Referring now to FIG. 7 showing a flowchart diagram of a method, in accordance with some exemplary embodiments of the disclosed subject matter.

On Step 710, hook code, code patches, or the like, may be added to a target function. In some exemplary embodiments, hooks may be placed on or adjacent to target functions that can be exploited to cause buffer overflows, that are susceptible to reading memory locations, that can cause memory leaks, or the like. The hooks may be added to the target functions to enforce runtime canaries on executables, or to employ other mechanisms to defend, report, alert, or the like, against such vulnerabilities during runtime.

On Step 730, when the target function is invoked, an address or a plurality of addresses in the memory that is accessed by the target function may be obtained. In some exemplary embodiments, the address may be an address being accessed in a write access (e.g., memory to which the target function writes), an address being accessed in a read operation (e.g., memory from which the target function reads), or the like.

On Step 740, a heuristic determination whether the target address is in the stack may be performed. In some exemplary embodiments, the address may be examined to determine whether it is pointing to a region within the stack memory. In some exemplary embodiments, the stack boundaries may be known; thus a few instructions may be used to determine whether the address is in the stack or not. Additionally or alternatively, the determination as to whether the address is in the stack or not may be performed by subtracting the address from current stack pointer and computing the distance therefrom. In case the distance is above a threshold, it may be assumed that the address is not located on the stack but rather in the heap. Additional mechanism and heuristics may be exploited to determine—precisely or heuristically— if the address is in the stack or not, such as reading the process'/proc/<PID>/maps in Linux system and looking at the stack-regions' ranges, or the like.

It is noted that Step 740 may be avoided. In some cases, such a determination may provide performance improvement as it avoids stack frame analysis when such analysis is not required.

On Step 750, in case the target address is not in the stack, the process may be stopped. In some cases, the original hooked function may be invoked regularly and allowed to perform its functionality.

On Step 760, in case the target address is in the stack, the base of the stack frame relevant to the target address may be determined. In some exemplary embodiments, the determination may be performed using the mapping between return-addresses and their stack offsets deltas relatively to function beginning (e.g. the mapping determined on Step 620 of FIG. 6). In some exemplary embodiments, Steps 630-680 of FIG. 6 may be performed in order to analyze the stack and identify the different stack frames until reaching the stack frame where the destination address points to. Analysis of the stack frames may be iterated until reaching an address which is higher than the destination buffer pointer (e.g., the return address is overflown).

On Step 770, a stack frame overflow identification may be performed. Stack frame overflow may be performed in case of a write operation. Additionally or alternatively, in case of a read operation, memory leakage identification may be performed.

Figure 8:
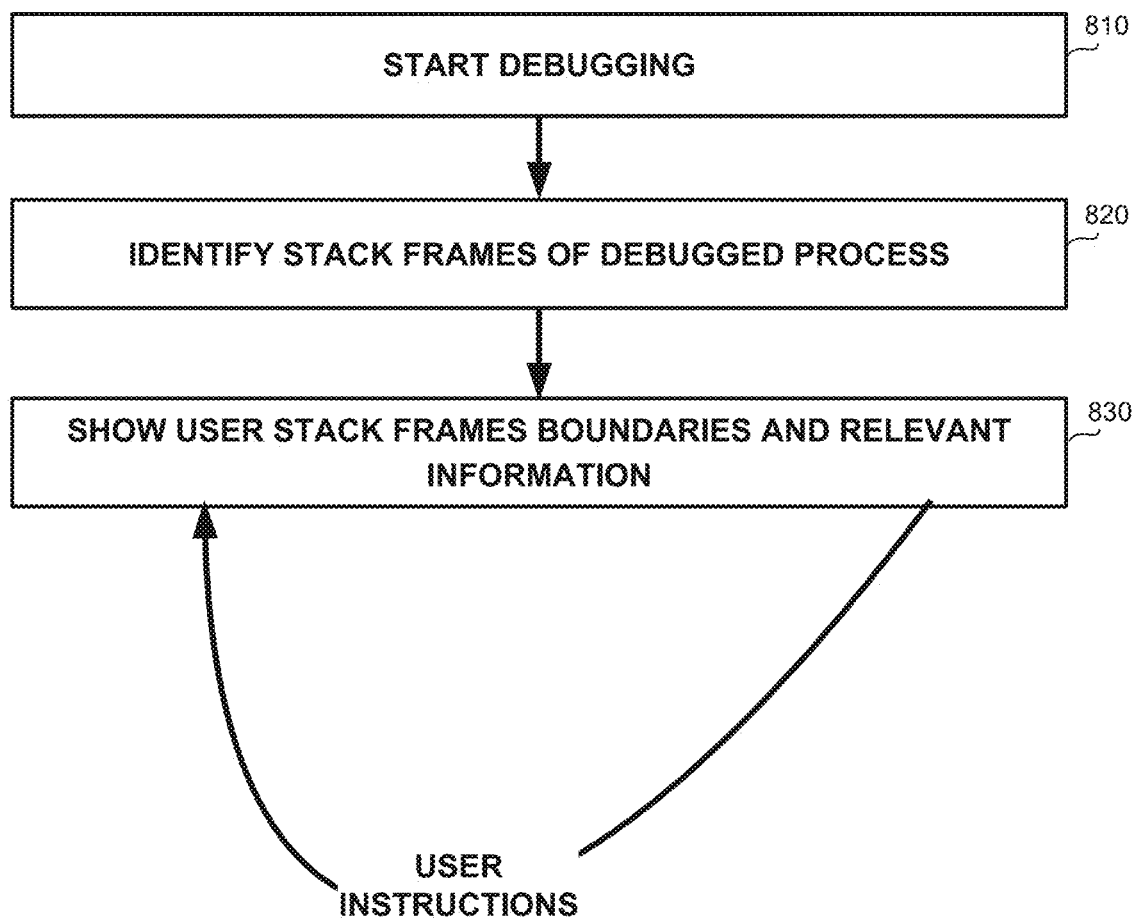
FIG. 8 illustrates a flowchart diagram of a method, in accordance with some exemplary embodiments of the disclosed subject matter.

Referring now to FIG. 8 showing a flowchart diagram of a method for inferring stack frames while debugging, in accordance with some exemplary embodiments of the disclosed subject matter.

On Step 810, debugging of a program may be started.

On Step 820, stack frames of a debugged process may be identified. In some exemplary embodiments, a mapping between return-addresses and their stack pointer deltas relatively to function beginning may be prepared, such as on Step 620 of FIG. 6. The mapping may be prepared for each binary being debugged. In some exemplary embodiments, Steps 630-680 of FIG. 6 may be performed in order to infer the division of the stack into stack frames.

On Step 830, user static frames boundaries and relevant information may be shown for each user instruction. In some exemplary embodiments, while debugging the binary, in any stage of debugging, the stack layout may be required in order to infer the location or functions flow where a program crashes, to infer breakpoints, to identify patched code, or the like. In some exemplary embodiments, stack frame information may be provided upon demand, in response to a debug instruction, or the like.

Figure 9:
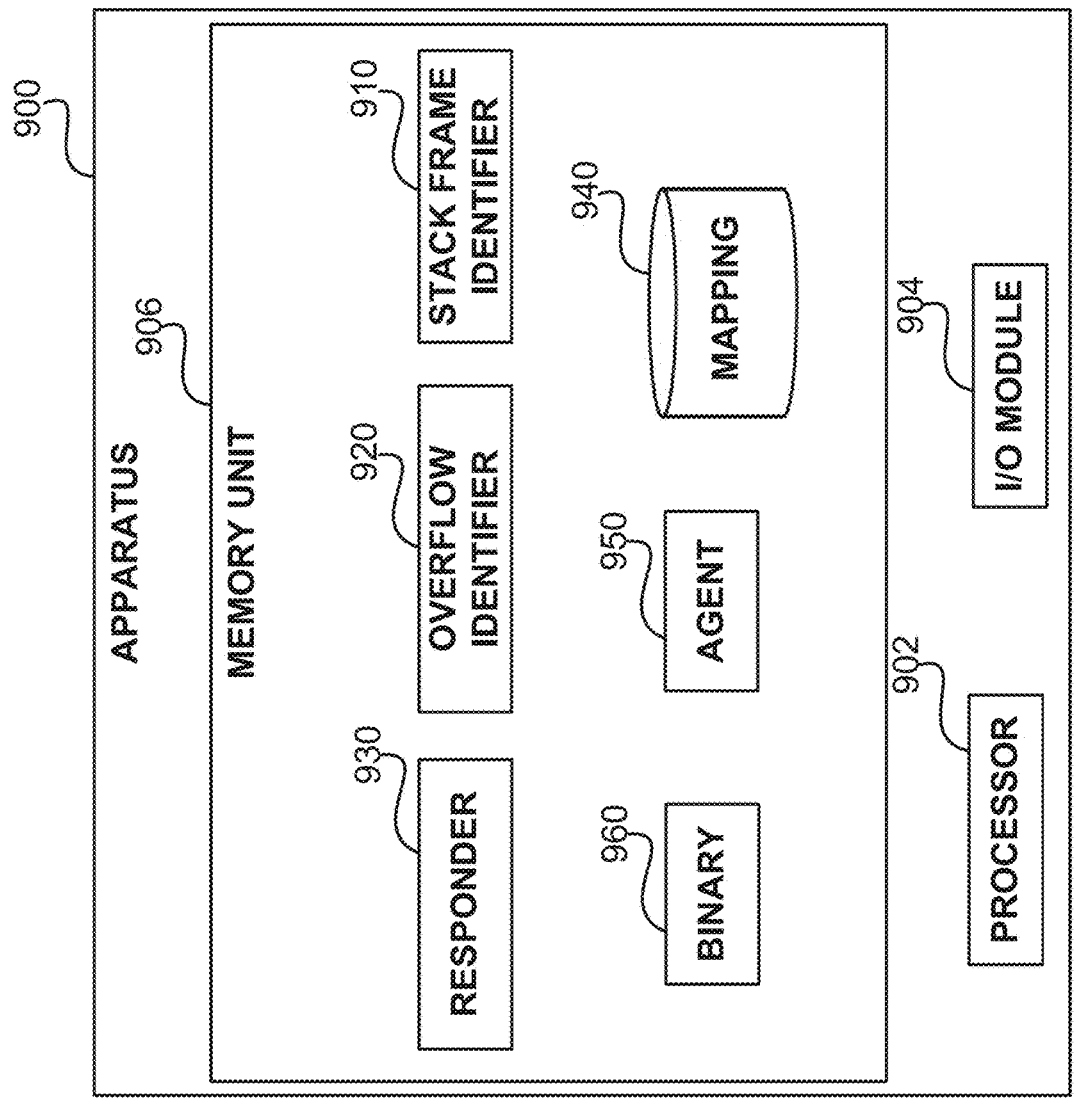
FIG. 9 illustrates a block diagram of an apparatus, in accordance with some exemplary embodiments of the disclosed subject matter.

Referring now to FIG. 9, showing an apparatus in accordance with some exemplary embodiments of the disclosed subject matter.

In some exemplary embodiments, Apparatus 900 may comprise one or more Processor(s) 902, an I/O Module 904, a Memory Unit 906, or the like. In some exemplary embodiments, Processor 902 may be utilized to perform computations required by Apparatus 900 or any of its subcomponents. I/O Module 904 may be configured to communicate with one or more computerized devices.

In some exemplary embodiments, Memory Unit 906 may be utilized to retain a Binary 960 of a program. In some cases, Binary 960 may reside on a different apparatus from Apparatus 900, and may be accessible, e.g., via I/O Module 904. In some exemplary embodiments, Binary 960 may include one or more functions that are potentially vulnerable to memory corruption attacks. In some exemplary embodiments, the one or more functions may comprise one or more code hooks, code patches, or the like.

In some exemplary embodiments, Memory Unit 906 may be utilized to retain an Agent 950 which may be configured to protect Binary 960 from memory corruption attacks during runtime. Agent 950 may comprise a program product executable by Apparatus 900, by a computer, or the like, that may be deployed at the client device. In some exemplary embodiments, Agent 950 may obtain or identify the one or more functions, obtain or insert the hooks thereto, and utilize the hooks in the functions during execution of Binary 960 to identify a write operation that has the potential to cause buffer overflows, a read operation that has the potential to cause memory leaks, or the like.

In some exemplary embodiments, Memory Unit 906 may be utilized to retain Mapping 940 including a mapping between return addresses of one or more functions that are potentially vulnerable in Binary 960 and corresponding lengths of the one or more functions. Mapping 940 may be obtained from a server, determined by Agent 950 or by any other component of Apparatus 900, provided by a user of Apparatus 900, or the like. In some cases, Mapping 940 may reside on a different apparatus from Apparatus 900, and may be accessible, e.g., via I/O Module 904.

In some exemplary embodiments, Memory Unit 906 may comprise Stack Frame Identifier 910. Stack Frame Identifier 910 may be configured to identify boundaries of stack frames of functions that are in the call stack (not illustrated). In some exemplary embodiments, Stack Frame Identifier 910 may obtain a return address of a function that is located in the stack, e.g., using a hook of the function, and retrieve a length of the function from Mapping 940. In some exemplary embodiments, Stack Frame Identifier 910 may extract from Mapping 940 a mapping of the return address of the current function with a corresponding length of the function. In some exemplary embodiments, Stack Frame Identifier 910 may determine a base address of stack frame of the function based on a value of a stack pointer and the retrieved length of the function.

In some exemplary embodiments, Stack Frame Identifier 910 may iteratively identify next stack frames by entering a next hook of a next function in the stack, obtaining a return address of the next function, retrieving the associated function length from Mapping 940 to determine the boundaries of the stack frame, and finding the next stack frame.

In some exemplary embodiments, Memory Unit 906 may comprise Overflow Identifier 920. In some exemplary embodiments, Overflow Identifier 920 may be configured to obtain from Stack Frame Identifier 910 stack frame boundaries of potentially vulnerable functions in the stack. In some exemplary embodiments, Overflow Identifier 920 may determine whether or not a stack frame of a function is overflown based on the stack frame boundaries. In some exemplary embodiments, Overflow Identifier 920 may insert a canary value to the stack, at a location that may be identified based on the boundaries of the stack frame, e.g., on top of a location of a return address, in a location adjacent thereto, or the like. In some exemplary embodiments, Overflow Identifier 920 may identify a buffer overflow in case that, right before completing an execution of the function, a value at the location of the canary value in the stack is determined to be different than the original canary value. Additionally or alternatively, Overflow Identifier 920 may determine a predicted number of bytes that are to be utilized by the function and compare the number to the maximal size of memory that can be placed within the boundaries of the stack frame, e.g., to determine whether an overflow is about to occur. Overflow Identifier 920 may identify memory-related actions that may cause data leaks by calculating the intended length of the intended operation and checking whether it crosses the stack-frame's bounds.

In some exemplary embodiments, Memory Unit 906 may comprise Responder 930. Responder 930 may be configured to perform a responsive action upon identifying a buffer overflow at Overflow Identifier 920, such as terminating an execution of the program, raising an interrupt, limiting access to the function, generating a report, inserting the original return address to the stack, or the like.

In some exemplary embodiments, Agent 950 may comprise any of Stack Frame Identifier 910, Overflow Identifier 920, Responder 930, Mapping 940, Binary 960, or portions thereof. In some exemplary embodiments, In some exemplary embodiments, Agent 950 may be configured to control or handle any of Stack Frame Identifier 910, Overflow Identifier 920, Responder 930, Mapping 940, Binary 960, or portions thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   during an execution of a program, obtaining boundaries of a stack frame of a function that is currently present in a stack without relying on a value of stack frame pointer within the stack, wherein said obtaining the boundaries comprises:
   obtaining a return address of the function in the stack;
   determining a stack offset delta of the function using a mapping of return addresses of one or more functions in the program and corresponding stack offset deltas of the one or more functions, wherein the stack offset delta is indicative of a difference between a current value of a stack pointer and a value of the stack pointer upon entering the function; and
   determining the boundaries of the stack frame of the function based on the current value of the stack pointer of the stack and based on the stack offset delta, wherein the stack pointer is configured to point to a top of the stack;
   based on the boundaries of the stack frame of the function, determining that the stack frame is overflown; and
   in response to said determining that the stack frame is overflown, performing a responsive action.

2. The method of claim 1 comprising placing a canary value in a location in the stack that is adjacent to or on top of the return address of the function, wherein said determining that the stack frame is overflown comprises determining that a value at the location in the stack, after execution of the function up to the return address, is different than the canary value.

3. The method of claim 1, wherein said determining that the stack frame is overflown is based on a predicted number of bytes to be utilized by the function and the boundaries of the stack frame.

4. The method of claim 1 comprising, prior to executing the function, verifying that a memory address of the function is in the stack.

5. The method of claim 1 comprising:
   during execution of the function, obtaining one or more memory addresses that are to be accessed by the function; and
   determining whether the one or more memory addresses are located in the stack, wherein, upon determining that the one or more memory addresses are not located in the stack, performing the responsive action.

6. The method of claim 1, wherein said determining that the stack frame is overflown is based on a determination that the function has crossed the boundaries of the stack frame.

7. The method of claim 1 comprising performing debugging of the program based on the mapping.

8. The method of claim 1, wherein a binary of the program comprises one or more hooks of the one or more functions, wherein said obtaining the boundaries utilizes at least one hook of the one or more hooks to obtain the return address of the function in the stack.

9. The method of claim 1 comprising analyzing a binary of the program to identify functions that comprise memory access functionality, thereby identifying the one or more functions; and determining the mapping for the one or more functions, wherein said analyzing and said determining the mapping are performed prior to the execution of the program.

10. The method of claim 1, wherein said obtaining the boundaries is performed iteratively by obtaining a stack offset delta of a target function in the stack from the mapping, determining a base address of a stack frame of the target function based on a value of a stack pointer of the stack and based on the stack offset delta of the target function, thereby obtaining boundaries of the stack frame of the target function, and identifying a next target function in the stack based on the boundaries of the stack frame of the target function.

11. The method of claim 1, wherein the responsive action comprises at least one of: terminating the execution of the program, raising an interrupt, limiting access to the function, and generating a report.

12. The method of claim 1 wherein the one or more functions are one or more vulnerable functions identified in the program.

13. A system comprising a processor and coupled memory, the processor being adapted to perform:
   during an execution of a program, obtaining boundaries of a stack frame of a function that is currently present in a stack without relying on a value of stack frame pointer within the stack, wherein said obtaining the boundaries comprises:
     obtaining a return address of the function in the stack;
     determining a stack offset delta of the function using a mapping of return addresses of one or more functions in the program and corresponding stack offset deltas of the one or more functions, wherein the stack offset delta is indicative of a difference between a current value of a stack pointer and a value of the stack pointer upon entering the function; and
     determining the boundaries of the stack frame of the function based on the current value of the stack pointer of the stack and based on the stack offset delta, wherein the stack pointer is configured to point to a top of the stack;
   based on the boundaries of the stack frame of the function, determining that the stack frame is overflown; and
   in response to said determining that the stack frame is overflown, performing a responsive action.

14. The system of claim 13, wherein the processor is configured to place a canary value in a location in the stack that is adjacent to or on top of the return address of the function, wherein said determining that the stack frame is overflown comprises determining that a value at the location in the stack, after execution of the function up to the return address, is different than the canary value.

15. The system of claim 13, wherein said determining that the stack frame is overflown is based on a predicted number of bytes to be utilized by the function and the boundaries of the stack frame.

16. The system of claim 13, wherein said determining that the stack frame is overflown is based on a determination that the function has crossed the boundaries of the stack frame.

17. The system of claim 13, wherein a binary of the program comprises one or more hooks of the one or more functions, wherein said obtaining the boundaries utilizes at least one hook of the one or more hooks to obtain the return address of the function in the stack.

18. The system of claim 13, wherein the processor is configured to analyze a binary of the program to identify functions that comprise memory access functionality, thereby identifying the one or more functions; and determine the mapping for the one or more functions, wherein the analysis of the binary and the determination of the mapping are configured to be performed prior to the execution of the program.

19. The system of claim 13, wherein said obtaining the boundaries is performed iteratively by obtaining a stack offset delta of a target function in the stack from the mapping, determining a base address of a stack frame of the target function based on a value of a stack pointer of the stack and based on the stack offset delta of the target function, thereby obtaining boundaries of the stack frame of the target function, and identifying a next target function in the stack based on the boundaries of the stack frame of the target function.

20. A computer program product comprising a non-transitory computer readable storage medium retaining program instructions, which program instructions when read by a processor, cause the processor to perform:
   during an execution of a program, obtaining boundaries of a stack frame of a function that is currently present in a stack without relying on a value of stack frame pointer within the stack, wherein said obtaining the boundaries comprises:
     obtaining a return address of the function in the stack;
     determining a stack offset delta of the function using a mapping of return addresses of one or more functions in the program and corresponding stack offset deltas of the one or more functions, wherein the stack offset delta is indicative of a difference between a current value of a stack pointer and a value of the stack pointer upon entering the function; and
     determining the boundaries of the stack frame of the function based on the current value of the stack pointer of the stack and based on the stack offset delta, wherein the stack pointer is configured to point to a top of the stack;
   based on the boundaries of the stack frame of the function, determining that the stack frame is overflown; and
   in response to said determining that the stack frame is overflown, performing a responsive action.

* * * * *